United States Patent
Okamura

(10) Patent No.: US 11,270,398 B2
(45) Date of Patent: Mar. 8, 2022

(54) PARKING MANAGEMENT APPARATUS

(71) Applicant: Toyota Jidosha Kabushiki Kaisha, Toyota (JP)

(72) Inventor: Ryuji Okamura, Gotemba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 90 days.

(21) Appl. No.: 16/778,451

(22) Filed: Jan. 31, 2020

(65) Prior Publication Data

US 2020/0258183 A1 Aug. 13, 2020

(30) Foreign Application Priority Data

Feb. 12, 2019 (JP) .............................. JP2019-022549

(51) Int. Cl.
*G06Q 50/30* (2012.01)
*G06Q 10/08* (2012.01)

(52) U.S. Cl.
CPC ............. *G06Q 50/30* (2013.01); *G06Q 10/08* (2013.01)

(58) Field of Classification Search
CPC ............................... G06Q 50/30; G06Q 10/08
USPC ............................................................ 705/13
See application file for complete search history.

(56) References Cited

U.S. PATENT DOCUMENTS

| | | | |
|---|---|---|---|
| 7,342,511 B2* | 3/2008 | Schuette | G07B 15/02 340/5.2 |
| 2004/0010445 A1 | 1/2004 | Schuette | |
| 2006/0114531 A1* | 6/2006 | Webb | G01N 21/8851 359/15 |

FOREIGN PATENT DOCUMENTS

| | | |
|---|---|---|
| CN | 207752652 U | 8/2018 |
| JP | 2002-218450 A | 8/2002 |
| JP | 2008-186394 A | 8/2008 |

OTHER PUBLICATIONS

"Intelligent Parking Management System Based on Image Processing" Published by World Journal of Engineering and Technology (Year: 2014).*

* cited by examiner

*Primary Examiner* — Zeina Elchanti
(74) *Attorney, Agent, or Firm* — Dinsmore & Shohl LLP

(57) ABSTRACT

A parking management apparatus is configured to manage parking of a vehicle in a parking lot. The parking management apparatus is provided with: a first acquirer configured to obtain first information about a state of the vehicle when the vehicle enters the parking lot; a second acquirer configured to obtain second information about the state when the vehicle exits from the parking lot; and a determinator configured to determine that an abnormality has occurred in the vehicle in the parking lot, when a difference between the first information and the second information exceeds a predetermined allowable range.

4 Claims, 4 Drawing Sheets

FIG. 4

| HOST VEHICLE STATE | SURROUNDING SITUATION | TIMING IN WHICH DIFFERENCE IS MADE | | | |
|---|---|---|---|---|---|
| | | TRAVEL ZONE (ENTRANCE) | PARKING ZONE | TRAVEL ZONE (EXIT) | EXIT ZONE |
| WHILE HOST VEHICLE IS STOPPED | NO OTHER VEHICLE/PEOPLE AROUND | — | — | — | — |
| | ANOTHER VALET VEHICLE IN THE VICINITY | ANOTHER VALET VEHICLE IS RESPONSIBLE | | | |
| | ANOTHER GENERAL VEHICLE IN THE VICINITY | ANOTHER GENERAL VEHICLE IS RESPONSIBLE | | | |
| | PEOPLE IN THE VICINITY | PEOPLE ARE RESPONSIBLE | | | |
| WHILE HOST VEHICLE TRAVELS | NO OTHER VEHICLE/PEOPLE AROUND | HOST VEHICLE IS RESPONSIBLE | — | HOST VEHICLE IS RESPONSIBLE | — |
| | ANOTHER VALET VEHICLE IN THE VICINITY | HOST VEHICLE AND ANOTHER VALET VEHICLE ARE RESPONSIBLE | — | HOST VEHICLE AND ANOTHER VALET VEHICLE ARE RESPONSIBLE | — |
| | ANOTHER GENERAL VEHICLE IN THE VICINITY | HOST VEHICLE AND ANOTHER GENERAL VEHICLE ARE RESPONSIBLE | — | HOST VEHICLE AND ANOTHER GENERAL VEHICLE ARE RESPONSIBLE | — |
| | PEOPLE IN THE VICINITY | HOST VEHICLE IS RESPONSIBLE | — | HOST VEHICLE IS RESPONSIBLE | — |

PARKING MANAGEMENT APPARATUS

CROSS REFERENCE TO RELATED APPLICATIONS

This application is based upon and claims the benefit of priority of the prior Japanese Patent Application No. 2019-022549, filed on Feb. 12, 2019, the entire contents of which are incorporated herein by reference.

BACKGROUND

1. Technical Field

Embodiments of the present disclosure relate to a parking management apparatus configured to manage the parking of a vehicle.

2. Description of the Related Art

For this type of apparatus, there is known an apparatus configured to monitor a state of a vehicle while it is parked. For example, Japanese Patent Application Laid Open No. 2008-186394 (Patent Literature 1) discloses an apparatus configured in such a manner that if an abnormality is detected in a parked vehicle by an in-vehicle sensor, the state of the vehicle is stored by using a camera.

In a technology/technique described in the Patent Literature 1, recording is performed only when the abnormality is detected by the in-vehicle sensor. Thus, there is no record stored if the abnormality cannot be detected by the in-vehicle sensor. Therefore, regarding the abnormality that cannot be detected by the in-vehicle sensor, it is hardly possible to know the occurrence of the abnormality and to specify a cause of the abnormality, which is technically problematic.

SUMMARY

In view of the aforementioned problem, it is therefore an object of embodiments of the present disclosure to provide a parking management apparatus that can determine whether or not an abnormality has occurred in a parked vehicle.

An aspect of a parking management apparatus according to the present disclosure is a parking management apparatus configured to manage parking of a vehicle in a parking lot, the parking management apparatus provided with: a first acquirer configured to obtain first information about a state of the vehicle when the vehicle enters the parking lot; a second acquirer configured to obtain second information about the state when the vehicle exits from the parking lot; and a determinator configured to determine that an abnormality has occurred in the vehicle in the parking lot, when a difference between the first information and the second information exceeds a predetermined allowable range.

BRIEF DESCRIPTION OF THE DRAWINGS

FIG. 4 is a table illustrates an example of a method of determining the location of a responsibility for an abnormality that has occurred in a vehicle.

DETAILED DESCRIPTION OF THE EMBODIMENT

Hereinafter, a parking management apparatus according to an embodiment of the present disclosure will be explained with reference to the drawings.
(Configuration of Apparatus)

Figure 1:
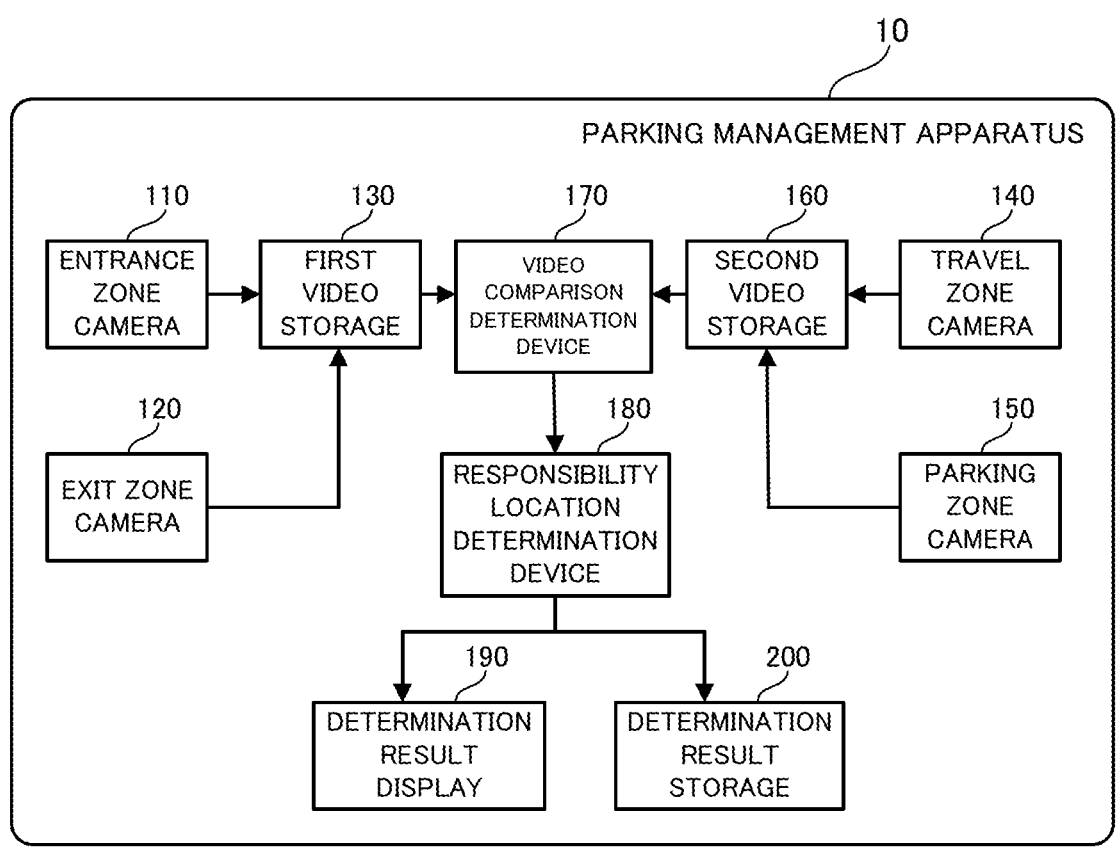
FIG. 1 is a block diagram illustrating a configuration of a parking management apparatus according to an embodiment.

Firstly, a configuration of the parking management apparatus according to the embodiment will be explained with reference to FIG. 1. FIG. 1 is a block diagram illustrating the configuration of the parking management apparatus according to the embodiment.

In FIG. 1, a parking management apparatus 10 according to the embodiment may be an apparatus configured to manage the parking of a vehicle in a parking lot that allows an automatic parking control (or so-called automated valet parking), and is configured to perform an automatic entrance control that allows the vehicle to enter the parking lot automatically or in an automated manner, and an automatic exit control that allows the vehicle to exit from the parking lot automatically or in an automated manner. Moreover, the parking management apparatus 10 according to the embodiment is particularly configured to determine whether or not an abnormality (e.g., damage of a vehicle body, etc.) has occurred in the vehicle in the parking lot. The parking management apparatus 10 is provided, as main constituents thereof, with an entrance zone camera 110, an exit zone camera 120, a first video storage 130, a travel zone camera 140, a parking zone camera 150, a second video storage 160, a video comparison determination device 170, a responsibility location determination device 180, a determination result display 190, and a determination result storage 200.

The entrance zone camera 110 may be a camera configured to image the vehicle located in an entrance zone (e.g., a zone in which the vehicle that enters the parking lot is temporarily stopped, such as a drop-off place), which is a start position of the automatic entrance control. The exit zone camera 120 may be a camera configured to image the vehicle located in an exit zone (e.g., a zone in which the vehicle that exits from the parking lot is temporarily stopped, such as a pick-up place), which is an end position of the automatic exit control. There may be also provided a plurality of entrance zone cameras 110 and a plurality of exit zone cameras 120. Videos (or still images) imaged respectively by the entrance zone camera 110 and the exit zone camera 120 may be temporarily stored in the first video storage 130, which includes, for example, a memory or the like. The entrance zone camera 110 and the exit zone camera 120 are respectively an example of the "first acquirer" and the "second acquirer" in Supplementary Notes described later.

The travel zone camera 140 may be a camera configured to image the vehicle located in a travel zone or a cruise zone (e.g., a zone including a travel path from the get-off place to a parking space and a travel path from the parking space to the pick-up place) in which the vehicle under the automatic entrance control or the vehicle under the automatic exit control travels or cruises. The parking zone camera 150 may be a camera configured to image the vehicle located in a parking zone (e.g., a zone including the parking space in which the vehicle is parked), which is an end position of the automatic entrance control, or a start position of the automatic exit control. There may be also provided a plurality of travel zone cameras 140 and a plurality of parking zone cameras 150. Videos (or still images) imaged respectively by the travel zone camera 140 and the parking zone camera 150 may be temporarily stored in the second video storage 160, which includes, for example, a memory or the like. The travel zone camera 140 and the parking zone camera 150 are an example of the "third acquirer" in Supplementary Notes described later.

The video comparison determination device 170 is configured to determine whether or not an abnormality has occurred in the vehicle that is parked, and in which timing the abnormality has occurred, by comparing the videos stored in the first video storage 130 (i.e., the videos imaged by the entrance zone camera 110 and the exit zone camera 120) with the videos stored in the second video storage 160 (i.e., the videos imaged by the travel zone camera 140 and the parking zone camera 150). A specific determination method performed by the video comparison determination device 170 will be explained in detail later. The video comparison determination device 170 is an example of the "determinator" in Supplementary Notes described later.

The responsibility location determination device 180 is configured to determine the location of a responsibility of the abnormality that has occurred in the vehicle, on the basis of a determination result of the video comparison determination device 170, and a situation when the abnormality occurs, which is separately obtained. The situation when the abnormality occurs can be obtained not only on the basis of the videos imaged by the cameras (i.e., the entrance zone camera 110, the exit zone camera 120, the travel zone camera 140, and the parking zone camera 150), but also on the basis of information obtained from various sensors, which are provided in the vehicle and the parking lot. A specific determination method performed by the responsibility location determination device 180 will be explained in detail later. The responsibility location determination device 180 is configured to output the determined location of the responsibility, together with the determination result of the video comparison determination device 170.

The determination result display 190 is configured to output determination results of the video comparison determination device 170 and the responsibility location determination device 180, for example, to a display provided in the parking lot, a terminal owned by a user of the vehicle, or the like. In other words, the determination result display 190 is configured to present the determination results of the video comparison determination device 170 and the responsibility location determination device 180, to the user of the vehicle or the like. The determination result display 190 is an example of the "presenter" in Supplementary Notes described later.

The determination result storage 200 is configured to store the determination results of the video comparison determination device 170 and the responsibility location determination device 180, in a readable condition. In other words, the determination result storage 200 is configured to output the determination results of the video comparison determination device 170 and the responsibility location determination device 180, as occasion demands, in accordance with a subsequent readout request. The determination result storage 200 is an example of the "storage" in Supplementary Notes described later.

(Explanation of Operations)

Figure 2:
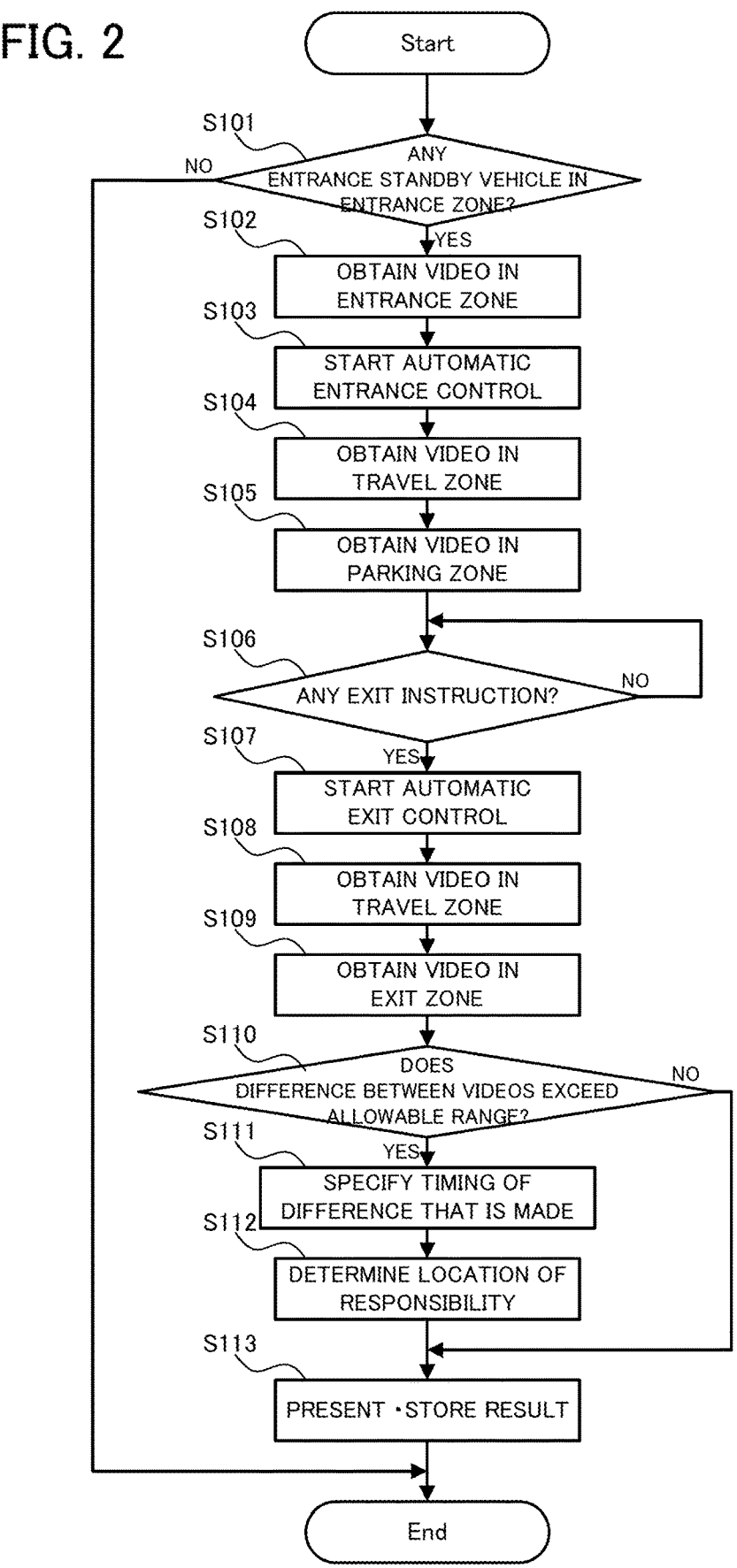
FIG. 2 is a flowchart illustrating a flow of operations of the parking management apparatus according to the embodiment.

Next, a flow of operations (or particularly, an operation of determining whether or not an abnormality has occurred in the parked vehicle) of the parking management apparatus 10 according to the embodiment will be explained with reference to FIG. 2. FIG. 2 is a flowchart illustrating a flow of operations of the parking management apparatus according to the embodiment.

As illustrated in FIG. 2, the parking management apparatus 10 according to the embodiment firstly determines whether or not there is an entrance standby vehicle (i.e., a vehicle that waits for the start of the automatic entrance control) in the entrance zone (step S101). If it is determined that there is no entrance standby vehicle in the entrance zone (the step S101: NO), the subsequent process is omitted, and a series of steps is ended. In this case, the parking management apparatus 10 may start the step S101 after a lapse of a predetermined period.

If it is determined that there is an entrance standby vehicle in the entrance zone (the step S101: YES), the entrance zone camera 110 obtains the video of the entrance standby vehicle 50 (hereinafter referred to as a "target vehicle" as occasion demands) in the entrance zone (step S102). By this, the video of the target vehicle in the entrance zone is stored in the first video storage 130.

The parking management apparatus 10 then starts the automatic entrance control of the target vehicle (step S103). Specifically, the parking management apparatus 10 may output an instruction to the target vehicle in the entrance zone, to depart for the parking zone through the travel zone. When the target vehicle starts to travel in the travel zone, the travel zone camera 140 obtains the video of the target vehicle in the travel zone (step S104). By this, the video of the target vehicle in the travel zone under the automatic entrance control is stored in the second video storage 160.

Then, when the target vehicle arrives in the parking zone, the parking management apparatus 10 may output an instruction to the target vehicle, to park in a predetermined parking space in the parking zone. When the target vehicle completes the parking, the automatic entrance control is ended. When the automatic entrance control is ended, the parking zone camera 150 obtains the video of the target vehicle (i.e., the target vehicle that is parked in the parking space) in the parking zone (step S105). By this, the video of the target vehicle while it is parked is stored in the second video storage 160.

After the automatic entrance control is ended, the parking management apparatus 10 determines whether or not there is an exit instruction for the target vehicle (i.e., a request to start the automatic exit control) (step S106). If it is determined that there is no exit instruction (the step S106: NO), the step S106 may be performed again after a while. If it is determined that there is an exit instruction (the step S106: YES), the parking management apparatus 10 starts the automatic exit control of the target vehicle (step S107). Specifically, the parking management apparatus 10 may output an instruction to the target vehicle in the parking zone, to depart for the exit zone through the travel zone. When the target vehicle starts to travel in the travel zone, the travel zone camera 140 obtains the video of the target vehicle in the travel zone (step S108). By this, the video of the target vehicle in the travel zone under the automatic exit control is stored in the second video storage 160.

Then, when the target vehicle arrives in the exit zone, the automatic exit control is ended. When the automatic exit control is ended, the exit zone camera 120 obtains the video of the target vehicle in the exit zone (step S109). By this, the video of the target vehicle in the exit zone is stored in the first video storage 130.

The video comparison determination device 170 then compares the video of the target vehicle m the entrance zone with the video of the target vehicle in the exit zone, and calculates a difference between the videos (i.e., difference data of video data). A detailed explanation of a method of calculating the difference between the videos because the existing technologies/techniques can be applied to the method as occasion demands. After calculating the difference between the videos, the video comparison determination device 170 determines whether or not the calculated difference exceeds an allowable range (step S110). The "allowable range" herein may be a threshold value set to determine whether or not an abnormality has occurred in the target vehicle, and an optimum value may be obtained and set in advance. For example, if the target body is newly damaged in its vehicle body, the difference between the videos before and after the damage may be set to exceed the allowable range.

Figure 3:
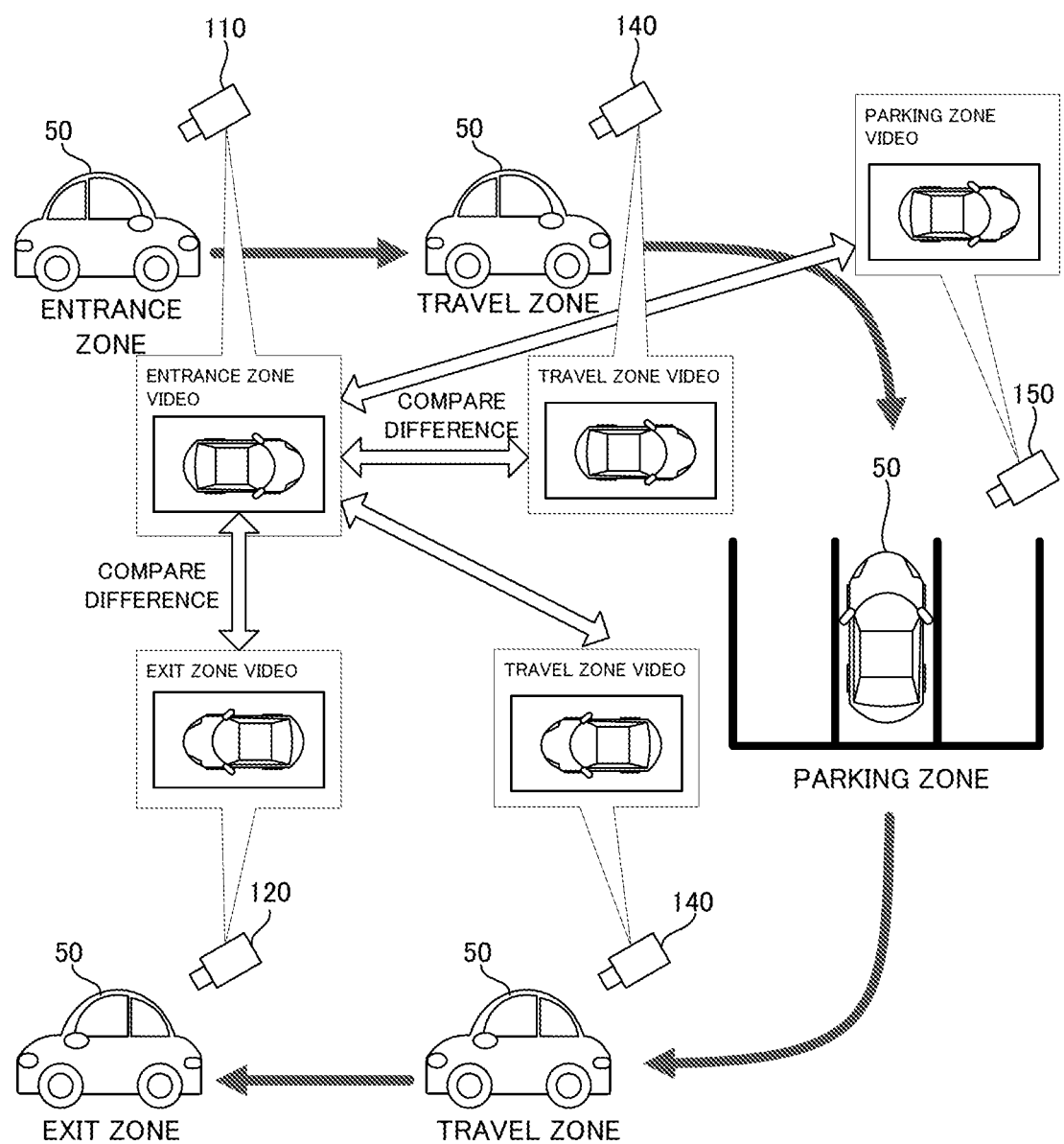
FIG. 3 is a schematic diagram illustrating an operation of comparing images, performed by the parking management apparatus according to the embodiment.

If it is determined that the difference between the videos exceeds the allowable range (the step S110: YES), the video comparison determination device 170 specifies the timing in which the abnormality has occurred, by further comparing the videos (step S111). Hereinafter, a specific explanation will be given to a method of specifying the timing in which the abnormality has occurred, with reference to FIG. 3. FIG. 3 is a schematic diagram illustrating an operation of comparing images, performed by the parking management apparatus according to the embodiment.

As illustrated in FIG. 3, the video in the entrance zone, the video in the travel zone under the automatic entrance control, the video in the parking zone, the video in the travel zone under the automatic exit control, and the video in the exit zone may be obtained from the entrance of the target vehicle to the exit. As explained above, whether or not an abnormality has occurred in the parking lot may be determined on the basis of whether or not the difference between the video in the entrance zone and the video in the exit zone exceeds the allowable range.

If it is determined that an abnormality has occurred in the target vehicle on the basis of the difference between the video in the entrance zone and the video in the exit zone, the video comparison determination device 170 may compare the video in the entrance zone with each of the video in the travel zone under the automatic entrance control, the video in the parking zone, and the video in the travel zone under the automatic exit control, thereby calculating the difference between the videos in each case. The video comparison determination device 170 may then determines in which timing the difference between the videos exceeds the allowable range. In this manner, it is possible to specify that the abnormality has occurred in the target vehicle in the timing in which the difference between the videos exceeds the allowable range.

Specifically, if the difference between the video in the entrance zone and the video in the travel zone under the automatic entrance control exceeds the allowable range, it can be determined that the abnormality has occurred from when the automatic entrance control is started to when the video in the travel zone is obtained (e.g., at a relatively early stage after the start of the automatic entrance control). If the difference between the video in the entrance zone and the video in the travel zone under the automatic entrance control does not exceed the allowable range, but if the difference between the video in the entrance zone and the video in the parking zone exceeds the allowable range, it can be determined that the abnormality has occurred from when the video in the travel zone under the automatic entrance control is obtained to when the video in the parking zone is obtained (e.g., while the target vehicle is parked in the parking zone). Alternatively, if the difference between the video in the entrance zone and the video in the travel zone under the automatic entrance control does not exceed the allowable range and if the difference between the video in the entrance zone and the video in the parking zone does not exceed the allowable range, but if the difference between the video in the entrance zone and the video in the travel zone under the automatic exit control exceeds the allowable range, it can be determined that the abnormality has occurred from when the video in the parking zone is obtained to when the video in the travel zone under the automatic exit control is obtained (e.g., at a relatively early stage after the start of the automatic exit control).

It is possible to specify the timing in which the abnormality has occurred, more finely, by obtaining a plurality of videos in the travel zone under the automatic entrance control, a plurality of videos in the parking zone, and a plurality of videos in the travel zone under the automatic exit control. In some embodiments, a plurality of travel zone cameras 140 may be provided in many locations in the travel zone. In some embodiments, in the parking zone, the imaging by the parking zone camera 150 may be performed regularly many times (or all the time while the target vehicle is parked) from the end of the automatic entrance control to the start of the automatic exit control.

Back in FIG. 2, when the timing in which the abnormality has occurred is specified, the responsibility location determination device 180 determines the location of the responsibility of the abnormality (step S112). Specifically, it may determine whether the target vehicle (hereinafter referred to as a "host vehicle" as occasion demands) is responsible for the abnormality that has occurred, or something else is responsible for the abnormality. Hereinafter, a specific explanation will be given to a method of determining the location of the responsibility, with reference to FIG. 4. FIG. 4 is a table illustrating an example of the method of determining the location of the responsibility for the abnormality that has occurred in the vehicle. In the following example, suppose that the parking lot is not only for the automated valet parking, and that the parking lot includes a vehicle that is being manually parked (hereinafter referred to as a "general vehicle" as occasion demands) and people (e.g., a pedestrian who gets off a vehicle) or the like, in addition to the vehicle that is performing the automated valet parking (hereinafter referred to as a "valet vehicle" as occasion demands).

As illustrated in FIG. 4, the responsibility location determination device 180 may determine the location of the responsibility of the abnormality, on the basis of the timing in which the difference is made between the videos (in other words, the timing in which the abnormality has occurred) and the situation at that time (specifically, a host vehicle state and a surrounding situation). The host vehicle state shall be one of "while the host vehicle is stopped" or "while the host vehicle travels". The surrounding situation shall be one of "no other vehicle/people around", "another valet vehicle in the vicinity", "another general vehicle in the vicinity", and "people in the vicinity".

In the case of "while the host vehicle is stopped" and "no other vehicle/people around", basically, an abnormality cannot occur in the host vehicle. If an abnormality occurs in this situation, it is hardly possible to specify the location of the responsibility. In other words, the location of the responsibility is unknown. In the case of "while the host vehicle is stopped" and "another valet vehicle in the vicinity", it is hard to think that the stopped host vehicle is responsible, and it is thus determined that the other valet vehicle is responsible, regardless of the timing in which the difference is made. In the case of "while the host vehicle is stopped" and "another general vehicle in the vicinity", it is hard to think that the stopped host vehicle is responsible, and it is thus determined that the other general vehicle is responsible, regardless of the timing in which the difference is made. In the case of "while the host vehicle is stopped" and "people in the vicinity", it is hard to think that the stopped host vehicle is responsible, and it is thus determined that people are responsible, regardless of the timing in which the difference is made.

The timing in which the difference is made on the premise of "while the host vehicle travels or cruises" may be limited to the travel zone under the automatic entrance control, or the travel zone under the automatic exit control. In the case of "while the host vehicle travels" and "no other vehicle/people around", it is determined that the traveling host vehicle is responsible. In the case of "while the host vehicle travels" and "another valet vehicle in the vicinity", it is determined that the traveling host vehicle and the other traveling valet vehicle are responsible. If the other valet vehicle is stopped, however, it may be determined that only the traveling host vehicle is responsible. In the case of "while the host vehicle travels" and "another general vehicle in the vicinity", it is determined that the traveling host vehicle and the other traveling general vehicle are responsible. If the other general vehicle is stopped, however, it may be determined that only the traveling host vehicle is responsible. In the case of "while the host vehicle travels" and "people in the vicinity", it is determined that the traveling host vehicle is responsible.

Back in FIG. 2, after the location of the responsibility is determined, the determination results obtained so far are displayed and stored (step S113). Specifically, the presence/absence of an abnormality, the timing of the occurrence of the abnormality, and the location of the responsibility of the abnormality may be presented to the user of the target vehicle or the like. Moreover, the determination result, storage 200 may store the presence/absence of an abnormality, the timing of the occurrence of the abnormality, and the location of the responsibility of the abnormality, in a readable condition. In the step S110, if it is determined that the difference between the videos does not exceed the allowable range (the step S110: NO), the absence of the abnormality is displayed and stored.

(Technical Effect)

Next, a technical effect obtained by the parking management apparatus 10 according to the embodiment will be explained.

As explained in FIG. 1 to FIG. 4, according to the parking management apparatus in the embodiment, it is possible to determine the occurrence of an abnormality in the parking lot, by comparing the video when the vehicle enters the parking lot with the video when the vehicle exits. Moreover, if it is determined that an abnormality has occurred, it is possible to specify the timing of the occurrence of the abnormality by comparing the video when the vehicle enters the parking lot with the video obtained in each zone of the parking lot. It is further possible to determine the location of the responsibility of the abnormality by using the timing of the occurrence of the abnormality. These determination (or specification) results may be presented to the user of the vehicle or the like. It is thus possible to easily inform the user or the like of the occurrence of an abnormality in the parking lot. The determination results may be also stored in the determination result storage 200. Thus, for example, even if the user misses the presentation of the determination results and would like to investigate the occurrence of an abnormality later, it is possible to read the stored information and present the determination results any time.

In the aforementioned embodiment, an explanation was given to a case where the target vehicle is automatically parked, but the same can apply even when the target vehicle is manually parked (i.e., when the parking is performed by a driver's operation).

(Modified Examples)

The aforementioned embodiment exemplifies that the videos are obtained by the cameras provided in the parking lot. In addition to or instead of the videos obtained by the cameras provided in the parking lot, the other information may be also used to determine an abnormality.

For example, if videos obtained by an in-vehicle camera for imaging a vehicle interior are used, from a difference between the videos, the occurrence of damage in the vehicle interior can be determined to be an abnormality. More specifically, if the difference between the videos obtained by the in-vehicle camera exceeds a predetermined allowable range (which is herein a threshold value set in accordance with the damage in the vehicle interior), it is possible to determine that an abnormality has occurred. In this case, the in-vehicle camera (or a part that obtains image data from the in-vehicle camera) may function as a specific example of the "first acquirer", the "second acquirer", and the "third acquirer" in Supplementary Notes described later.

Moreover, if load information of the target vehicle obtained by a load sensor provided in the parking lot is used, from a difference in the load information, a loss of a loaded object or the like can be determined to be an abnormality. More specifically, if the difference in the in the load information exceeds a predetermined allowable range (which is herein a threshold value set in accordance with the weight of the loaded object determined to be the loss), it is possible to determined that an abnormality has occurred. In this case, the load sensor (or a part that obtains the load information from the load sensor) may function as a specific example of the "first acquirer", the "second acquirer", and the "third acquirer" in Supplementary Notes described later.

Moreover, if information about a battery amount and a fuel amount obtained by an in-vehicle sensor provided in a vehicle is used, from a difference in the information, an unnecessarily-long-distance travel by the vehicle (e.g., due to a defect of the automated valet parking, the vehicle keeps traveling for a long time in the parking lot or travels to a parking space extremely far from the drop-off place, etc.) can be determined to be an abnormality. More specifically, if a difference in a remaining battery or remaining fuel exceeds an allowable range (which is herein a threshold value set in accordance with the distance determined to be an unnecessary travel), it is possible to determine that an abnormality has occurred. In this case, the in-vehicle sensor (or a part that obtains the information about a battery or fuel from the in-vehicle sensor) may function as a specific example of the "first acquirer", the "second acquirer", and the "third acquirer" in Supplementary Notes described later.

<Supplementary Notes>

Various aspects of embodiments of the present disclosure derived from the embodiment explained above will be explained hereinafter.

(Supplementary Note 1)

A parking management apparatus described in Supplementary Note 1 is a parking management apparatus configured to manage parking of a vehicle in a parking lot, the parking management apparatus provided with: a first acquirer configured to obtain first information about a state of the vehicle when the vehicle enters the parking lot; a second acquirer configured to obtain second information about the state when the vehicle exits from the parking lot; and a determinator configured to determine that an abnormality has occurred in the vehicle in the parking lot, when a difference between the first information and the second information exceeds a predetermined allowable range.

According to the parking management apparatus described in Supplementary Note 1, it is possible to determine the occurrence of an abnormality in the parking lot, depending on whether or not the first information obtained when the vehicle enters the parking lot and the second information obtained when the vehicle exits from the parking lot exceeds the predetermined allowable range. The "predetermined allowable range" may be set by obtaining an optimum value in advance as a threshold value for detecting an abnormality.

(Supplementary Note 2)

In a parking management apparatus described in Supplementary Note 2, the state includes at least one of (i) an appearance of the vehicle obtained by a camera provided in the parking lot, (ii) a state inside the vehicle obtained by a camera provided in the vehicle, (iii) a load of the vehicle obtained by a sensor provided in the parking lot, (iv) a battery amount obtained by a sensor provided in the vehicle, and (v) a fuel amount.

According to the parking management apparatus described in Supplementary Note 2, it is possible to determine an abnormality of the vehicle by using each state described above. For example, from the appearance of the vehicle, the damage of a body or the like can be determined. From the state inside the vehicle, the damage of a vehicle interior or the like can be determined. From the load of the vehicle, an increase/decrease in a loaded object or the like can be determined. From the battery amount and the fuel amount, an unnecessarily-long-distance-travel by the vehicle or the like can be determined.

(Supplementary Note 3)

A parking management apparatus described in Supplementary Note 3 is further provided with: a third acquirer configured to obtain third information about the state, after the first information and before the second information; and a specifier configured to specify timing in which the abnormality has occurred in the vehicle, on the basis of the third information, if it is determined by the determinator that the abnormality has occurred.

According to the parking management apparatus described in Supplementary Note 3, it is possible to specify the timing of the abnormality by using the third information obtained after the entrance and before the exit (in other words, while the vehicle moves to a parking space or while the vehicle is parked). In order to specify the timing more accurately, the third information may be obtained at a plurality of timers.

(Supplementary Note 4)

A parking management apparatus described in Supplementary Note 4 is further provided with a presenter configured to present a determination result by the determinator, to a user of the vehicle.

According to the parking management apparatus described in Supplementary Note 4, it is possible to inform the user of the occurrence of an abnormality in a parked vehicle.

(Supplementary Note 5)

A parking management apparatus described in Supplementary Note 5 is further provided with a storage configured to store a determination result by the determinator, as readable information.

According to the parking management apparatus described in Supplementary Note 5, it is possible to investigate the occurrence of an abnormality by reading the information stored in the storage.

The present disclosure may be embodied in other specific forms without departing from the spirit or characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A parking management apparatus configured to manage parking of a vehicle in a parking lot, said parking management apparatus comprising:
    a first camera configured to obtain first information about a state of the vehicle when the vehicle enters the parking lot;
    a second camera configured to obtain second information about the state when the vehicle exits from the parking lot;
    a third camera configured to obtain third information about the state after the vehicle enters the parking lot and before the vehicle exits the parking lot;
    a video comparison determination device configured to determine that an abnormality has occurred in the vehicle in the parking lot, when a difference between the first information and the second information exceeds a predetermined allowable range, and, upon determination that an abnormality has occurred in the vehicle in the parking lot, determine a timing at which the abnormality has occurred based on the third information;
    a responsibility location determination device configured to determine a surrounding situation of the vehicle at the timing at which the abnormality occurred based on the third information, and determine a location of the responsibility of the abnormality based on the timing and the surrounding situation of the vehicle at the timing at which the abnormality occurred; and
    a determination result display to present the presence of the abnormality and the location of the responsibility of the abnormality to a user of the vehicle.

2. The parking management apparatus according to claim 1, wherein the state includes at least one of (i) an appearance of the vehicle obtained by a camera provided in the parking lot, (ii) a state inside the vehicle obtained by a camera provided in the vehicle, (iii) a load of the vehicle obtained by a sensor provided in the parking lot, (iv) a battery amount obtained by a sensor provided in the vehicle, and (v) a fuel amount.

3. The parking management apparatus according to claim 1, further comprising a presenter configured to present a determination result by said video comparison determination device, to a user of the vehicle.

4. The parking management apparatus according to claim 1, further comprising a storage configured to store a determination result by said video comparison determination device, as readable information.

* * * * *